United States Patent
Trifon et al.

(10) Patent No.: US 8,818,865 B2
(45) Date of Patent: Aug. 26, 2014

(54) METHOD AND SYSTEM FOR GENERATING BURSTING-MESSAGES

(75) Inventors: Gal Trifon, Michmoret (IL); Nir Ben Zvi, Bellevue, WA (US); Ofer Zadikario, Ra'anana (IL); Hanit Galili, Kfar Malal (IL); Efraim Cohen, Herzliya (IL); Amir Hardoof, Bet-Lehem Ha'glilit (IL)

(73) Assignee: Sizmek Technologies Ltd., Ra'anana (IL)

( * ) Notice: Subject to any disclaimer, the term of this patent is extended or adjusted under 35 U.S.C. 154(b) by 1150 days.

(21) Appl. No.: 12/134,882

(22) Filed: Jun. 6, 2008

(65) Prior Publication Data

US 2008/0244445 A1    Oct. 2, 2008

Related U.S. Application Data

(63) Continuation of application No. 09/893,228, filed on Jun. 27, 2001, now abandoned.

(30) Foreign Application Priority Data

Jun. 29, 2000 (IL) .......................................... 137106

(51) Int. Cl.
*G06Q 30/00* (2012.01)
(52) U.S. Cl.
USPC ........................................ 705/14.73; 715/240
(58) Field of Classification Search
USPC ........................................ 705/14.73; 715/240
See application file for complete search history.

(56) References Cited

U.S. PATENT DOCUMENTS

| | | | |
|---|---|---|---|
| 5,204,947 A | 4/1993 | Bersnstein et al. | |
| 5,850,218 A * | 12/1998 | LaJoie et al. | 725/45 |
| 5,948,061 A * | 9/1999 | Merriman et al. | 705/14.53 |
| 6,061,659 A | 5/2000 | Murray | |
| 6,161,127 A * | 12/2000 | Cezar et al. | 709/203 |
| 6,295,061 B1 | 9/2001 | Park et al. | |
| 6,307,573 B1 * | 10/2001 | Barros | 715/764 |
| 6,442,590 B1 * | 8/2002 | Inala et al. | 709/204 |
| 6,941,345 B1 | 9/2005 | Kapil et al. | |
| 6,973,436 B1 | 12/2005 | Shkedi | |
| 2001/0056370 A1 * | 12/2001 | Tafla | 705/14 |
| 2002/0062245 A1 | 5/2002 | Niu et al. | |

FOREIGN PATENT DOCUMENTS

| | | |
|---|---|---|
| IL | 133560 | 12/1999 |
| WO | WO 9735280 A2 * | 9/1997 |
| WO | WO 9847090 A1 * | 10/1998 |
| WO | WO01/35302 A1 | 5/2001 |
| WO | WO01/44969 A2 | 6/2001 |
| WO | WO02/21238 | 3/2002 |

* cited by examiner

*Primary Examiner* — Michael Bekerman
(74) *Attorney, Agent, or Firm* — M&B IP Analysts, LLC

(57) ABSTRACT

A method for generating Bursting-messages on the window of a user's Web-terminal while browsing a Web-site. Indication related to the connection of the user to the Web-site is provided. Data that is required for generating a Burst-message on the Web-terminal is sent to the Web-terminal of the identified user and a Burst-message is generated on the Web-terminal using the data. Interaction means are provided to the user in the Burst-message, for the interaction of the user with the Burst-message and/or with the Web-site. The Burst-message may be generated by dynamically writing an HTML layer and/or JavaScript and/or VBScript.

41 Claims, 2 Drawing Sheets

METHOD AND SYSTEM FOR GENERATING BURSTING-MESSAGES

CROSS-REFERENCE TO RELATED APPLICATION

This application is a Rule 1.53 (b) continuation of Ser. No. 09/893,228, filed Jun. 27, 2001 now abandoned, the entire contents of which are incorporated herein by reference herein.

FIELD OF THE INVENTION

The present invention relates to the field of generating messages over the Internet. Moreover, the present invention is related to a method and system for generating bursting-messages on the user's Web-terminal.

BACKGROUND OF THE INVENTION

The Internet space today is crowded with sites offering a wealth of information for Web-surfers. Each site presents its contents and merchandise using Web pages that make up the site. The site-marketing manager employs various methods and techniques in order to attract users to the site and to offer users an entertaining and effective experience while browsing the site pages.

Among the most known marketing techniques used by Web-sites are advertisements, membership clubs, special deals, coupon offerings and so forth.

A whole new industry evolved around online advertising and the interaction of a Web-site with its users. One-to-one marketing tools are solutions widely used by sites to achieve effective communication between the site and the user. These rely upon data accumulated on each individual user to deliver targeted marketing campaigns, tailored to the user's personal habits. E-commerce sites, for example, have recognized that one-to-one marketing solutions are essential for customer retention and for increasing the site's revenues. The best-known one-to-one solutions are targeted e-mail, used to communicate with consumers off-site, and personalized HTML solutions, rearranging the Web-page content to present the customer with individually selected offers, when the user is on-site.

In order to better understand the description below, the following terms are explained and defined:
  Burst-message is a message that is prompted to a user while browsing a Web-site.
  E-commerce (electronic commerce or EC) is the buying and selling of goods and services on the Internet, especially the World Wide Web.
  Cache is a memory used to store something more or less temporarily. For example, Web pages are stored in browsert's cache directory on the hard disk. This way, when returning to a page recently browsed, the browser can get it from the cache rather than the original server, which results in saving time and additional traffic on the network.
  HTML (Hypertext Markup Language) is the set of "markup" symbols or codes inserted in a file intended for display on a World Wide Web browser. The markup tells the Web browser how to display a Web page's words and images for the user. The individual markup codes are referred to as elements (but many people also refer to them as tags).
  DHTML (Dynamic HTML) is a collective term for a combination of new HTML tags and options, style sheets, and programming that enables to create Web pages more animated and more responsive to user interaction than previous versions of HTML. Dynamic HTML can allow Web documents to look and act like desktop applications or multimedia productions.
  Java is a programming language expressly designed for use in the distributed environment of the Internet. Java can be used to create complete applications that may run on a single computer or be distributed among servers and clients in a network. It can also be used to build small application modules or applets for use as part of a Web page. Applets make it possible for a Web page user to interact with the page.
  Java applet is a small Java program that can be sent along with a Web page to a user. Java applets can perform interactive animations, immediate calculations, or other simple tasks without having to send a user request back to the server.
  JavaScript is an interpreted programming or script language from Netscape. It is somewhat similar in capability to Microsoft's Visual Basic, Sun's Tcl, the UNIX-derived Perl, and IBM's REXX. In general, script languages are easier and faster to code in than the more structured and compiled languages such as C and C++. Script languages generally take longer to process than compiled languages, but are very useful for shorter programs.
  VB-Script is an interpreted script language from Microsoft that is a subset of its Visual Basic programming language. VB-Script can be compared to other script languages designed for the Web, including Perl, TCL, JavaScript.

It is an object of the present invention to provide a method and system for generating bursting-messages on the window presented to a user browsing a Web-site, such that said messages attributes can be varied externally to said Web-site.

It is another object of the present invention to provide a method and system for generating a Bursting-message on the window presented to a user browsing a Web-site, such that said message is created as a layer of the current HTML page displayed on said displayed window.

It is a further object of the present invention to provide a method and system for generating a bursting-message on the window presented to a user browsing a Web-site, such that said message is not a part of the Web-pages downloaded from said Web-site.

It is a still further object of the present invention to provide a method and system for generating a Bursting-message on the window presented to a user browsing a Web-site, such that said message comprises multimedia presentation.

It is a still further object of the present invention to provide a method and system for generating a Bursting-message on the window presented to a user browsing a Web-site, such that said message is an interactive hypertext entity.

It is a still further object of the present invention to provide a method and system for generating a Bursting-message on the window presented to a user browsing a Web-site, without using additional display software.

It is a still further object of the present invention to provide a method and system for generating a Bursting-message on the window presented to a user browsing a Web-site, such that the generation of said message has a minor influence on the performance of the display of said Web-site;

It is a still further object of the present invention to provide a method and system for generating a Bursting-message on the window presented to a user browsing a Web-site, which are suitable for any Operating-System, and/or browsing device.

Other objects and advantages of the invention will become apparent as the description proceeds.

SUMMARY OF THE INVENTION

In one aspect, the present invention is directed to a method for generating Bursting-messages on the window of a user's Web-terminal while browsing a Web-site, comprising the steps of:
- a) Providing indication related to the connection of the user to the Web-site;
- b) Sending data required for generating a Burst-message on the Web-terminal to the Web-terminal of the identified user;
- c) Generating a Burst-message on the Web-terminal using the data.

The method may further comprise providing to the user, interaction means in the Burst-message, for the interaction of the user with the Burst-message and/or with the Web-site.

Optionally, the Burst-message is generated by dynamically writing an HTML layer and/or JavaScript and or VBScript.

Optionally, the data required for generating a Burst-message is sent to the Web-terminal in the time periods when potentially no other data is downloaded into the Web-terminal from the Web-site.

The method may further comprise storing the sent data in the Web-terminal prior to the display of the Burst-message.

Optionally, the Burst-message provides link(s) to one or more Web-site(s).

Optionally, the indication is provided by executing a software component embedded in Web-page(s) of the Web-site, browsed by the user.

Optionally, the identification is carried out by using the IP address of the user.

Optionally, the data required for generating a Burst-message is a software component(s) and/or multimedia data and/or textual data.

Optionally, the Burst-message is generated on the Web-terminal by executing the software component(s) and/or displaying one or more components of the multimedia data.

Optionally, the Web-terminal is a computer.

Optionally, the Web-terminal is a set-top box.

Optionally, the Web-terminal is a device able to execute a DHTML page.

Optionally, the Burst-message is interactive or passive.

Optionally, the Burst-message is terminated as a result of a predefined event.

Optionally, the Burst-message is terminated as a result of an input from the user.

Optionally, the Burst-message comprises entertainment components.

Optionally, the Burst-message comprises advertising components.

Optionally, the Burst-message comprises chat components.

In another aspect, invention is directed to a system for generating Bursting-messages, comprising:
- A Web-terminal for displaying Burst-messages;
- A Web-server for storing files and software components required for the operation of the Web-site, for indicating the presence of a user browsing the Web-site and for identifying the user by its IP address;
- A Burst-server for storing the Burst-messages data and executional files needed for the generation of the Burst-messages.

Optionally, the Web-terminal is a computer.
Optionally, the Web-terminal is a set-top box.
Optionally, the Web-terminal is a device able to execute DHTML pages.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

Sending and displaying a Bursting-message on the user's browser is carried out in the following steps:
- A software component is downloaded along with the HTML page. The software component can be downloaded in a separate HTML frame, or by said HTML page. According to a preferred embodiment of the invention, the separated HTML frame is a hidden frame, so that this process is transparent to the user;
- At an appropriate moment for executing the Bursting-message, the component downloads the content of the Bursting-message (such as multimedia files) into the cache of the browser. This is performed in parallel with the current activity of the browser, particularly during the time periods when no download is required, so that the content download has minimal impact on actual performance of the Web-pages being executed;
- After downloading the content into the browser's cache, the component creates a layer or fills in an existing layer on the HTML page that is currently presented to the user. The newly generated layer contains both content and script;
- The component activates said script or manipulates the newly written layer. In any event, the layer is activated to form the Bursting-message that may move according to the script written inside the layer; and
- The termination of the message may be invoked either by said script or by the component that initiated the Bursting-message.

Figure 1:
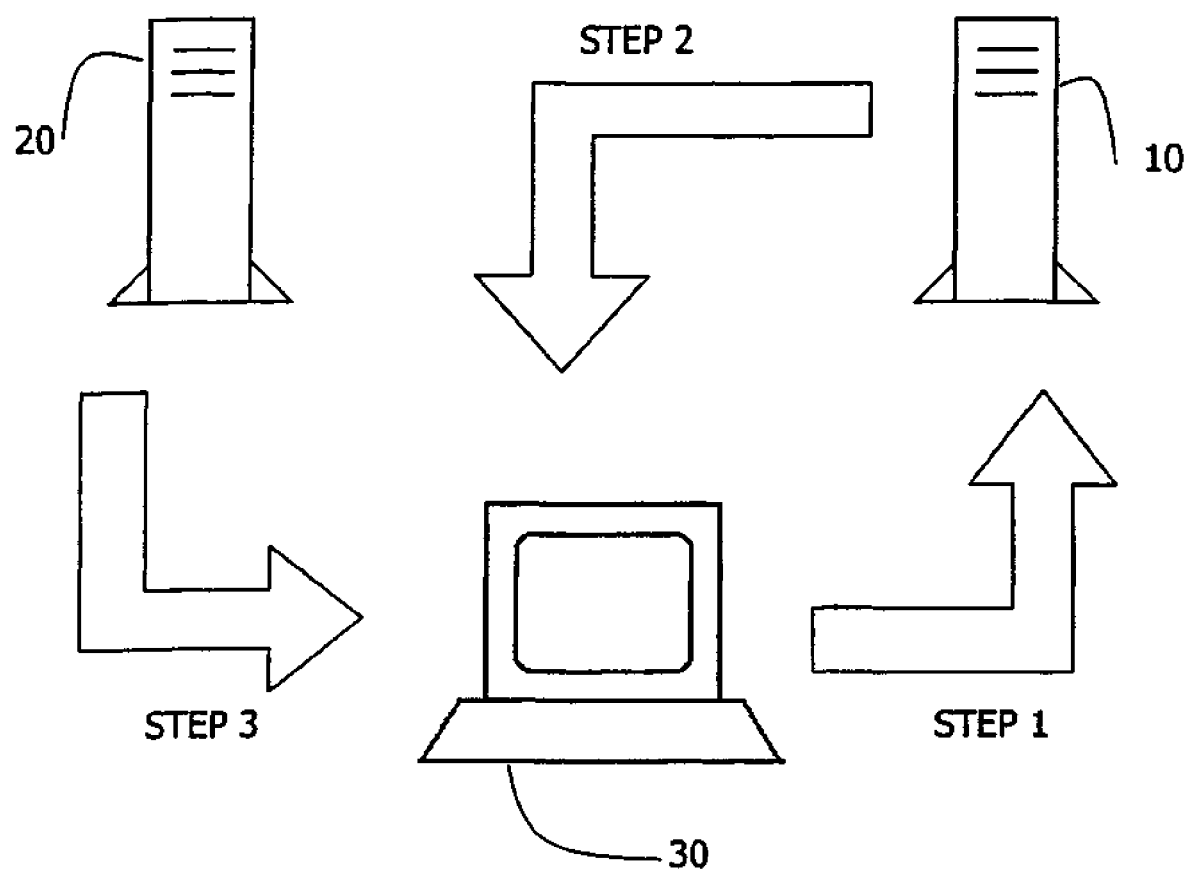
FIG. 1 schematically illustrates a system and a method for producing Bursting-messages, according to a preferred embodiment of the invention.

FIG. 1 schematically illustrates a system for producing Bursting-messages, according to a preferred embodiment of the invention. The system comprises the following components:
- A Web-server 10, for storing the files of the Web-site and for executing the programs that interact with the users when surfing on the Web-site associated with server 10;
- A Burst-server 20, for storing the Burst-messages data and executional files needed for the generation of the Burst-messages;
- A Web-terminal 30, by which the user interacts with Web-sites.

The method comprises the following steps:

In step 1, a user connected through Web-terminal 30, executes a Web-browser program and gets in touch with Web-site 10. The Web-terminal 30 may be a personal computer, a Web-TV, and so forth;

In step 2, Web-server 10 sends the HTML page to a Web-terminal 30 with a tag that includes the Bursting components that are downloaded in step 3 from the Burst-server 20 to Web-terminal 30.

In step 3, Burst-server 20 sends a Burst-message to Web-terminal 30.

Of course, Burst-server 20 and Web-server 10 may be physically the same server. The separation was due to clarification purposes, such that the separation category is the functionality of the servers.

Figure 2:
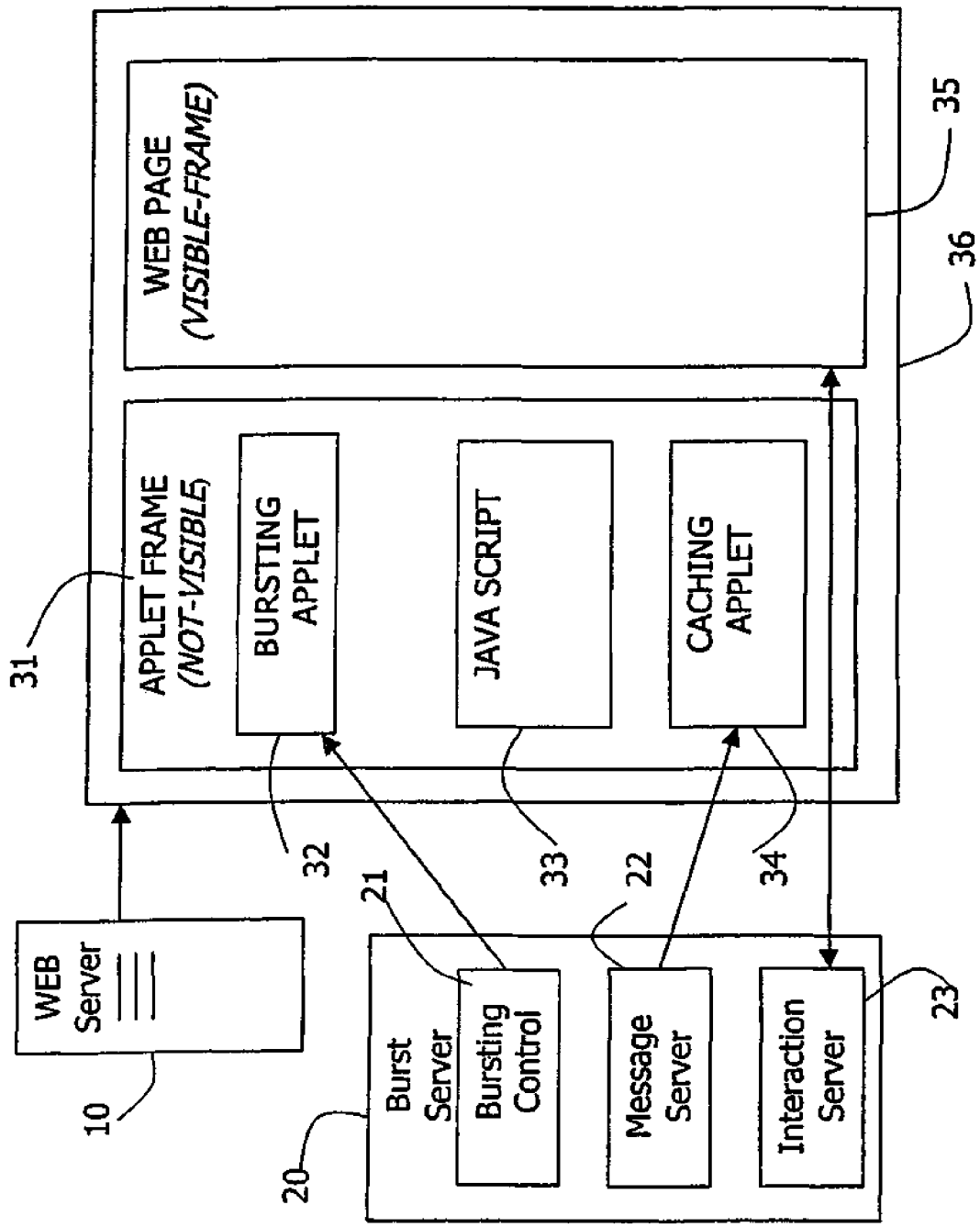
FIG. 2 schematically illustrates the software components of a system for producing Bursting-messages, according to a preferred embodiment of the invention.

FIG. 2 schematically illustrates the software components of a system for producing Bursting-messages, according to a preferred embodiment of the invention.

Bursting-Applet 32

In order to achieve maximum platform independence, a Java applet handles the launch of the Bursting-message. The Bursting-applet does the following:

Provides an accessible API to the HTML code on the Web-site's pages (API—Application Program Interface—defines how programmers utilize a particular computer feature);

Automatic user data gathering;

Communication with the "Bursting-control server";

Execution of server-initiated Bursting-messages;

Execution of applet-initiated Bursting-messages; and

Execution of content-download in the background.

Applet Frame 31

The applet frame is an HTML frame that includes three main parts:

1. A "Bursting-applet" 32, which may be downloaded from the "Bursting-control server";
2. JavaScript functions 33, which are used both to communicate with the Bursting-applet 32 and to play "Bursting-messages"; and
3. A caching applet 34' which is used to download "Bursting-message" content in the background, into the browser cache prior to playing the "Bursting-message".

The description is related to the Java family of Web-programming tools. However, those skilled in the art will appreciate that the invention may be implemented also by using other Web-programming tools, such as VB-Script, etc.

In the HTML (HyperText Markup Language) the use of frames allows authors to present documents in multiple views. For example, within the same window, one frame might display a static banner, a second frame might display a navigation menu, and a third frame the main document that can be scrolled down or replaced by navigating in the second frame.

Caching Applet 34

According to a preferred embodiment of the invention, the generation of the Bursting-message is carried out by using a Java applet. The caching applet 34 is used to download "Bursting-message" content (i.e. images, audio files, video files, animation files and so forth) in the background, into the browser cache prior to playing the "Bursting-message".

Web-Page 35 (Visible Frame)

the web-site frame 35 is the actual web-site page, which is visible to the user while browsing the Web-site.

Bursting-Control Server 21

The Bursting-control server 21 may issue commands to the Bursting-applet 32 that will trigger Bursting-messages.

Message Server 22

The message-server 22 is a server that stores the message content files (i.e. images, sound). Those skilled in the art will appreciate that a message content file may reside in several message-servers.

The message server 22 is not necessarily a stand-alone server. Rather, it can be part of any other server.

User Interaction Server 23

The user interaction server 23 is used to log user interaction with the "Bursting-message" and redirect the user who clicked on the "Bursting-message" to the appropriate destination.

Enabling Bursting-In a Web-Site

In order to enable Bursting-messages in a Web-site, the site has to add the "Applet frame" as a hidden frame into the Web-site pages 36 or add the three parts of the "Applet frame" directly into the Web-site pages in case the Web-site does not use frames.

The Web-site developer can also interact with the "Bursting-applet" 32 through a set of API that allows to pause/restart the Bursting-message activity and to send relevant information to the "Bursting-applet" 32.

Displaying a Bursting-Message

The "Overlaying Bursting-message" is a Bursting-message that appears on top of the current page that the user is browsing. It is executed in the browser window. Actually, it is a layer that is dynamically written on the Web page displayed in the user machine.

Working in the browser environment, the Bursting-message utilizes both the caching capabilities of the browser in order to download content in the background and the Dynamic HTML capabilities to dynamically write and manipulate a layer appearing in the browser window.

There are four stages in an overlaying Bursting-message life cycle:

In the first stage, the multimedia files needed to play the Bursting-message are downloaded from the Message-server 22 to the user's machine 30. This is carried out in the background with the intention of exploiting idle communication time as much as possible for downloading the content.

In the second stage, the "Bursting-applet" 32 dynamically writes a transparent layer into the "Web-site frame" 35. This layer contains both the Bursting-message content and a set of JavaScript functions that will display the message to the user and execute the "Bursting-message" scenario (i.e. move the layer in a specified scenario, activate the audio in a specified order, and so forth).

In the third stage, the actual execution of the "Bursting-message" is carried out. In this stage, the layer from the previous stage is made visible to the user and the script functions that were dynamically written are activated to perform the "Bursting-message" scenario.

In the fourth stage, the "Bursting-message" comes to its end. The "Bursting-message" will be terminated in case of a predefined period of time that has passed since the message display started, or due to closing the message or the associated Web-page by the user.

Below, is one of the ways to implement the process described above:

Downloading Content in the Background

The initiation of a "Bursting-message" will include a JavaScript command for initializing the content downloading or displaying of the message. The command string will contain a name of a display script function (which is located on the same frame as the applet), and the parameters for the download and the display.

The applet will use the Live Connect JSObject in order to call JavaScript to execute the command. (LiveConnect is a Netscape product, which enables communication between JavaScript and Java applets in a page. It also enables communication between JavaScript and plug-in.)

If background download should be initiated, a URL for downloading the content should appear in one of the parameters. The initiating script function will call the caching applet with the appropriate URL for downloading the content and store a new state. (A URL—Uniform Resource Locator—is the address of a file accessible on the Internet. The resource can be an HTML page, an image file, a program such as a CGI application or Java applet, or any other file supported by HTTP.)

The applet will download the HTML code from the provided URL and dynamically write it into a special tag in the Applet frame.

The code will cause the content to be downloaded to the user's cache in the background.

The content download may be terminated at any point of time by calling another script function. The function will call the Caching applet to stop downloading the content. Later on, we can reinitiate the process, and the content, which already exist in the cache, will be detected automatically.

Once the download is over, the script function will be notified by a callback from the Caching applet.

Prepare for Playing the "Bursting-Message"

After the content download is complete, the state will be modified, and another script function will be called to dynamically write a new transparent layer into the visible Web-site HTML frame;

The new written layer will contain both HTML tags of the Bursting-message content (which is already in the browser cache) and JavaScript functions that control the scenario of the Bursting-message.

Note that the content of the Bursting-message may be collected from various servers as well as the JavaScript functions that may come from a different server. This allows coupling of different Bursting-scenarios (JavaScript) to different Bursting-templates (HTML content).

Playing a Message

The new written layer JavaScript function is called to start the "Bursting-message" scenario.

Terminating the Display of a Message

The initiating script function will set the new state and initiate an interval for checking the state of the message.

In most cases, the message will terminate itself, and the script code on the apple's frame may identify the termination.

After a predefined time-out, the script function may cause the displayed message to disappear.

Once the display is over, the state on the frame will be updated and the applet will be notified.

Playing Bursting-Message on an Installed Software Package

Bursting-messages may also be played through existing software packages installed on the user machine. For example, a Bursting-message may be an HTML page. The "Bursting-apple" will launch a new browser window with the appropriate parameters to display the requested HTML page. Another example is the "Real player" which can be invoked by the "Bursting-applet" to play a video clip as a Bursting-message.

The "Bursting-applet" will be able to use the same technique of launching a software package with the appropriate parameters in order to play various types of multimedia Bursting-messages.

As described in the previous section, according to the software package, the "Bursting-applet" will also be able to download the content in the background prior to playing the "Bursting-message".

Interaction with Bursting-Message

The user may click the Bursting-message in order to go to the URL that the Bursting-message directs him/her to.

When the user clicks the Bursting-message, a URL request to the "User interaction server" is invoked with a parameter stating the actual destination URL of the message. The "User interaction server" logs the interaction and redirects the request to the actual destination.

Of course, the redirection may be carried out without the intermediation of the "User interaction server", but directly to the URL.

The Bursting-messages may be implemented in a variety of fields. For example:

Online advertising—Displaying advertisements over the Web;

Entertaining—playing computer games over the Web;

E-mail—notification of new E-mail messages while browsing a Web-site;

E-commerce—such as offering a deal to the user;

Chat—a user may send a message to another user, while both users browse the same Web page.

The above examples and description have, of course, been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method for generating and displaying at least one Bursting-message on a users Web-terminal, while the user browses a Web-site from said Web-terminal, said method comprising:

downloading to said user's Web-terminal a software component in conjunction with a web page of a Web-site for generating at least one Bursting-message on said user's Web-terminal for display on top of the web page, wherein the software component is downloaded in a separate HTML hidden frame;

downloading content of said at least one Bursting-message by means of said software component to said users Web-terminal, said content being conveyed in conjunction with the corresponding code that enables generating said at least one Bursting-message;

writing to an existing Web-page overlayer with said content of said at least one Bursting-message and said corresponding code, said Web-page overlayer is at least the hidden HTML frame of said Web-page; and generating said at least one Bursting-message by executing said corresponding code that causes said at least one Bursting message to become visible on top on said Web-page, such that the Bursting-message is prompted to the user while browsing said web-site.

2. The method according to claim 1, further comprising providing a portion of the corresponding code for allowing the user to interact with at least one Burst-message.

3. The method according to claim 1, further comprising gathering data from said users Web-terminal.

4. The method according to claim 3, further comprising conveying the content of the at least one Bursting-message according to the data gathered from said users Web terminal by means of the conveyed software component.

5. The method according to claim 1 further comprising conveying at least one of: the software component, content of at least one Bursting-message and corresponding code to said user's Web-terminal during time periods when no other data is conveyed to said users Web-terminal.

6. The method according to claim 5, further comprising deriving the time periods by executing the corresponding code embedded within the Web-page.

7. The method according to claim 1, further comprising providing links to one or more Web-sites by means of the at least one Bursting-message.

8. The method according to claim 1, further comprising conveying the data required for generating and displaying the at least one Bursting-message in response to execution of the corresponding code filled within the Web-page overlayer.

9. The method according to claim 1, further comprising providing the data required for generating and displaying the at least one Bursting-message as one or more of the following: corresponding code, multimedia data and textual data.

10. The method according to claim 9, further comprising generating the at least one Bursting-message by at least one of: executing the corresponding code and rendering one or more components of the multimedia data.

11. The method according to claim 1, further comprising providing the at least one Bursting-message as interactive or passive Bursting-message.

12. The method according to claim 1, further comprising terminating the at least one Bursting-message upon a pre-defined event.

13. The method according to claim 1, further comprising terminating the at least one Bursting-message upon an input from the user.

14. The method according to claim 1, further comprising providing the at least one Bursting-message with one or more entertainment components.

15. The method according to claim 1, further comprising providing the at least one Bursting-message with one or more advertising components.

16. The method according to claim 1, further comprising providing the at least one Bursting-message with one or more chat components.

17. The method according to claim 1, further comprising providing the corresponding code as JavaScript or VB (Visual Basic) script.

18. The method according to claim 1, further comprising providing the Web-terminal as a computer.

19. The method according to claim 1, further comprising providing the Web-terminal as a set-top box.

20. The method according to claim 1, further comprising providing the Web-terminal as a device able to execute DHTML (Dynamic HTML) pages.

21. A system for generating and displaying at least one Bursting-message on a users Web-terminal, while the user browses a Web-site from said Web-terminal, said system comprising:
  a web-terminal configured to a Web-site that contains one or more Web-pages;
  a Web-server configured to store files required for operation of said Web-site; and
  a Burst-server configured to:
    send a downloaded to said Web-terminal of a software component in conjunction with said one or more Web-pages of said Web-site for generating at least one Bursting-message on said Web-terminal for display on top of the one or more Web-pages while the user browses a Web-site, wherein the software component is downloaded in a separate HTML hidden frame; and
    send a download of content of said at least one Bursting-message to said Web-terminal by means of said software component in conjunction with a corresponding code that is used for generating said at least one Bursting-message;
    write to an existing Web-page overlayer with said content of said at least one Bursting-message and corresponding, said Web-page overlayer is at least a hidden HTML frame of said Web-page; and
    generate said at least one Bursting-message by executing said corresponding code that causes said at least one Bursting message to become visible on top on a Web-page over the web terminal, such that the Bursting-message is prompted to the user while browsing said web-site.

22. The system according to claim 21, wherein the Web-terminal is a computer.

23. The system according to claim 21, wherein the Web-terminal is a set-top box.

24. The system according to claim 21, wherein the web-terminal is a device able to execute DHTML (Dynamic HTML) pages.

25. The system according to claim 21, wherein the software component gathers data from the Web-terminal to which it is conveyed.

26. The system according to claim 25, wherein the at least one Bursting-message is conveyed to the Web-terminal according to the data gathered by means of the software component.

27. The system according to claim 21, wherein the corresponding code is stored within the Burst-server to be conveyed to the Web-terminal or is provided within the corresponding Web-page of the Web-site.

28. The system according to claim 21, wherein the use further interacts with the at least one Bursting-message.

29. The system according to claim 21, wherein at least one of the software component, content of at least one Bursting-message and corresponding code is conveyed to the Web-terminal during time periods when no other data is conveyed to said Web-terminal.

30. The system according to claim 29, wherein said time periods are derived by executing the corresponding code embedded within the Web-page overlayer of the Web-site browsed by said user.

31. The system according to claim 21, wherein the corresponding code is JavaScript or VB (Visual Basic) script.

32. The system according to claim 21, wherein the at least one Bursting-message provides respective links to one or more Web-site(s).

33. The system according to claim 21, wherein the data required for generating and displaying the at least one Bursting-message is one or more of the following: corresponding code, multimedia data and textual data.

34. The system according to claim 33, wherein the at least one Bursting-message is generated on the Web-terminal by at least one of: executing the corresponding code and rendering one or more components of said multimedia data.

35. The system according to claim 21, wherein the at least one Bursting-message is interactive or passive.

36. The system according to claim 21, wherein the at least one Bursting-message is terminated in response to a pre-defined event.

37. The system according to claim 21, wherein the at least one Bursting-message is terminated in response to an input from the user.

38. The system according to claim 21, wherein the at least one Bursting-message comprises one or more entertainment components.

39. The system according to claim 21, wherein the at least one Bursting-message comprises one or more advertising components.

40. The system according to claim 21, wherein the at least one Bursting-message comprises one or more chat components.

41. A non-transitory computer readable medium, tangibly embodying a program of instructions executable by the machine to perform a method for generating and displaying at least one Bursting-message on a users Web-terminal, while the user browses a Web-site from said Web-terminal, said method comprising:

downloading to said user's Web-terminal a software component in conjunction a web-page of a Web-site for generating at least one Bursting-message on said users Web-terminal for display on top of the web-page, wherein the software component is downloaded in a separate HTML hidden frame;

downloading content of said at least one Bursting-message by means of said software component to said users Web-terminal, said content being conveyed in conjunction with the corresponding code that enables generating said at least one Bursting-message;

writing to an existing Web-page overlayer with said content of said at least one Bursting-message and with said corresponding code, said Web-page overlayer is at least the hidden HTML frame of said Web-page; and generating said at least one Bursting-message by executing said corresponding code that causes said at least one Bursting message to become visible on top on said Web-page, such that the Bursting-message is prompted to the user while browsing said web-site.

\* \* \* \* \*